Feb. 26, 1952 B. F. GRIB 2,587,145

CONTINUOUS FACSIMILE SCANNER

Filed Nov. 28, 1947 5 Sheets-Sheet 1

INVENTOR.

BORIS F. GRIB

BY Darby & Darby.

ATTORNEYS

Feb. 26, 1952 B. F. GRIB 2,587,145

CONTINUOUS FACSIMILE SCANNER

Filed Nov. 28, 1947 5 Sheets-Sheet 2

INVENTOR.
BORIS F. GRIB
BY Darby & Darby.
ATTORNEYS

INVENTOR.
BORIS F. GRIB
BY Darby & Darby
ATTORNEYS

INVENTOR.
BORIS F. GRIB
BY Darby & Darby
ATTORNEYS

INVENTOR.
BORIS F. GRIB
BY Darby & Darby
ATTORNEYS

Patented Feb. 26, 1952

2,587,145

UNITED STATES PATENT OFFICE 2,587,145

CONTINUOUS FACSIMILE SCANNER

Boris F. Grib, Brooklyn, N. Y.

Application November 28, 1947, Serial No. 788,365

6 Claims. (Cl. 346—113)

This invention relates to improvements in scanning devices both for recording and reproduction.

The main object of this invention is to provide an improved mechanism by means of which unidirectional continuous linear facsimile recording and reproduction can be effected.

A more specific object of the invention is the provision in a recorder or reproducer of a pair of scanning units and operating mechanism therefor for causing the return movement of one of the scanning units during the scanning movement of the other, whereby continuous recording or reproduction can be obtained.

A still more specific object of the invention is to provide a commutating mechanism operated in conjunction with the recording or reproducing units whereby they are alternately rendered operative during their active scanning stroke.

A still more specific object of the invention is to provide in a mechanism of this type means for causing vertical movement of the stylus of the returning unit so that it will pass with the stylus of the recording unit without interference.

A still more specific object of the invention is to provide in such a mechanism a stylus construction such that as the stylus wears its point of contact with the reproducing or recording medium will not change.

Other and more detailed objects of the invention will be apparent from the following description of the embodiments thereof illustrated in the attached drawings.

This invention resides substantially in the combination, construction, arrangement and relative location of parts, all as will be described in detail below.

In most commercial facsimile transmitters and receivers the recording and reproducing units employ a drum on which the sheet containing the data to be transmitted and the sheet on which it is to be received are respectively attached to the drums in the transmitter and recorder. The result of this arrangement is that but a single sheet of data, the length of which is determined by the diameter of the drum, can be transmitted and received. In other words, the drums must be reloaded for each sheet of data to be transmitted. There are some systems for continuous facsimile recording and reproducing, but they are generally unsatisfactory. The purpose of this invention is to provide a continuous recording and reproducing machine in which the recorded and reproduced matter is limited only by the length of the receiving and transmitting sheets which may be in the form of rolls.

The combination of this invention generally comprises a pair of recording or reproducing heads, that is scanning heads which move alternately transversely of the length of the sheet, one moving through its return stroke to the starting edge of the sheet while the other is recording or reproducing.

It will be apparent that this disclosure provides that the subject matter of the invention is not limited to any particular type of scanning head. As will be seen, the scanning head for recording or reproduction may be either of the mechanical, the electrical, or the optical type. It will also be apparent in view of this possibility of variation that the strip containing the data to be transmitted and the strip upon which the transmitted data is to be recorded may be of any of the various types known in the art, as adapted for mechanical, electrical and optical transmission and reception.

Figure 4:
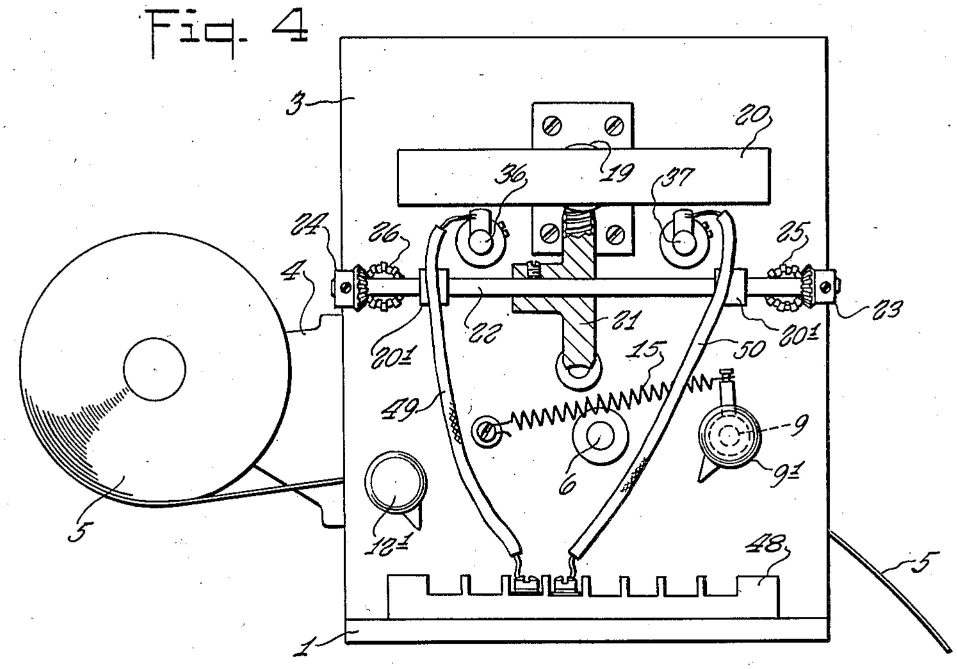
Figure 4 is an end elevational view of the left-hand end of Figure 1.
Figure 5:
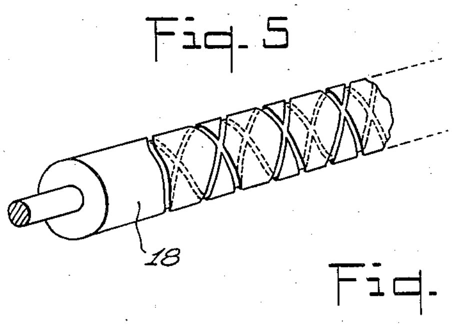
Figure 5 is a detailed perspective view of a portion of the feed screw.
Figure 6:
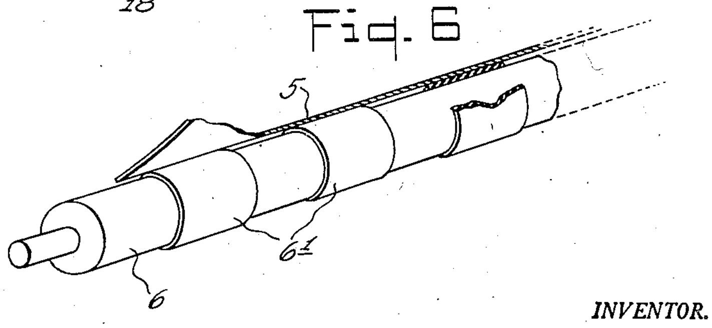
Figure 6 is a similar view of the feed roll.
Figure 7:
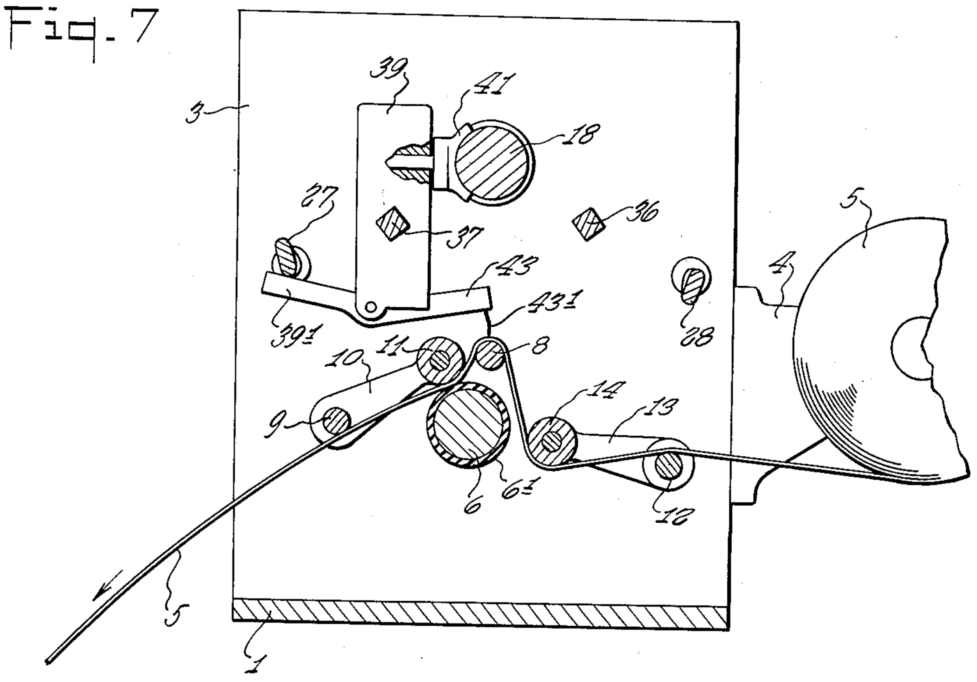
Figure 7 is a cross-sectional view taken on the line 7—7 of Figure 2.

The embodiment of the invention illustrated in the attached drawings comprises a base 1 having a pair of vertical parallel standards 2 and 3 in the form of plates in and on which the various elements of the completed mechanism are mounted. As shown in Figures 4 and 7 the roll of strip material 5 is rotatably supported from the rear edges of the plates 2 and 3 by a pair of brackets 4. In the case of a transmitter that is the reproducer, the roll 5 consists of a long strip of material bearing the data to be transmitted and the strip 5 will, of course, be of material suitable for the particular type of transmitting scanning head employed.

Figure 3:
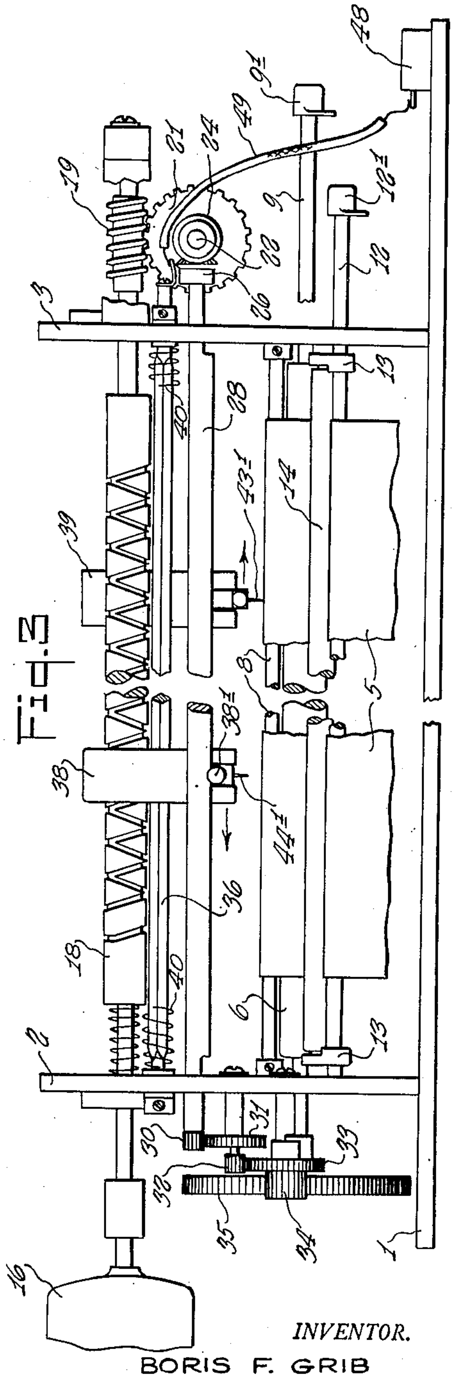
Figure 3 is a side elevational view thereof.

The paper strip 5 passes from the roll (see Fig. 7) over a shaft 12 which is journaled in the plates 2 and 3 and is provided with an operating knob 12′ (see Fig. 3). Resting upon the paper is an idler roller 14 which is journaled on a pair of arms 13 secured to the shaft 12. The idler roller 14 acts as a floating weight on the paper strip which then passes over a fixed rod 8 extending between the plates 2 and 3 forming an anvil along the line of contact of the supply of the paper strip. From there the strip passes between the feed roller 6 and the idler roller 11 which is journaled on a pair of arms 10 secured to a shaft 9 in turn journaled between the plates 2 and 3. The shaft 9 extends beyond the plate 3 and is provided with an operating knob 9′ and is urged by means of a spring 15 (see Fig. 4) in a clockwise direction (Fig. 7) to grip the paper strip between the feed roller 6 and the idler roller 11. Thus the feed roller 6 which is power driven, as will be explained later, cooperating with the idler roller 11 draws the paper over the anvil bar 8 from the roll 5 and the desired tension on the strip is maintained by the weight of the idler roller 14.

Figure 8:
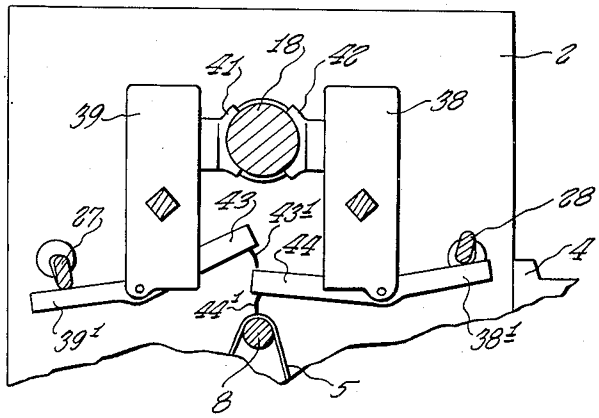
Figure 8 is a similar view with some parts broken away showing how one stylus passes the other.
Figure 9:
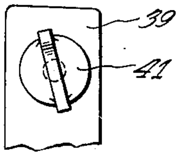
Figure 9 is an enlarged detailed view showing the mounting of the half nut.

At 16 is diagrammatically illustrated the power source for the machine which may be the electric motor 16 attached to the feed screw 18 by means of a suitable coupling device 17. The shaft on which the feed screw 18 is mounted or is a part of is journaled in the bearings 18′ and 18″ secured in the plates 2 and 3 respectively, as clearly shown in Figure 2. A compression spring $18^a$ urges the feed screw 18 to the right, as shown, against an antifriction thrust bearing $18^b$ mounted in a bar 20 attached by means of standards to the outside of plate 3. A worm 19 is secured to the shaft of the feed screw 18 and meshes with a worm wheel 21 secured to a transverse shaft 22 (see Fig. 4), mounted in suitable bearing supports 20′ secured to the outer face of plate 3. Attached to the ends of the shaft 22 are a pair of bevel gears 23 and 24 which mesh respectively with bevel gears 25 and 26 attached to the projecting ends of the cam bars 27 and 28 respectively. At the opposite ends the cam bars 27 and 28 project beyond the plate 2 in which they are also journaled and the bar 27 is provided with a commutator comprising the conductive disc 29 and an insulating semicircular strip 29′ mounted thereon (see particularly Fig. 1). The other projecting end of the cam bar 28 is provided with a pinion 30 (see Fig. 3) meshing with a pair of intermediate pinions 31 and 32 secured together for joint rotation. Pinion 32 meshes with another pair of intermediate pinions 33 and 34 which are secured together for conjoint rotation. Pinion 34 meshes with a gear 35 which is secured to the end of feed roll 6 (see Figs. 1 and 10). Extending between the plates 2 and 3 are a pair of bars or rods 36 and 37 of a non-circular cross-sectional form on which are slidably mounted the scanning heads 38 and 39 which have holes therethrough of the same configuration (see Figs. 7 and 9) so that the scanning heads are held in vertical position as shown. Pivotally mounted at the bottom of the scanning heads 38 and 39 (see Fig. 8) are the levers 44 and 43 respectively which have projecting tail pieces 38′ and 39′ for cooperation with the cam bars 28 and 27 respectively. Mounted on the levers 43 and 44 are the longitudinally curved styli 43′ and 44′ respectively. These styli are curved on the center of rotation of the levers 43 and 44 and are positioned with respect to the anvil bar 8 so as to be directly above the longitudinal axis thereof. As these styli wear, as they will under constant use, it will be seen that their position directly over the longitudinal axis of the platen bar 8 will not shift or change. In other words as the styli 43′ and 44′ wear smaller they will still hold their correct position with respect to the platen bar.

Figure 2:
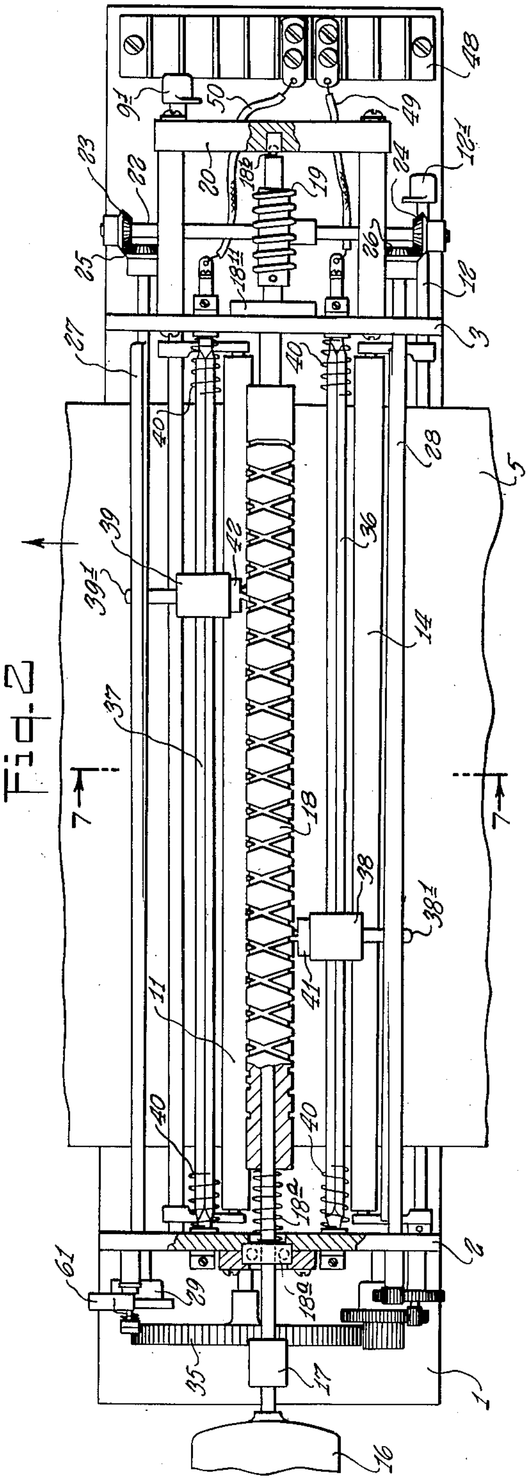
Figure 2 is a top plan view thereof.

As it clear from Figure 2, there are mounted at the opposite ends of each of the guide rods 36 and 37, compression springs 40 which serve to cushion the scanning heads as they reach the end of their stroke in each direction. The scanning heads 38 and 39 are provided with half nuts 41 and 42 which are rotatably mounted in the respective scanning heads (see Fig. 2) and are positioned, of course, to ride in the double set of threads in the feed screw 18. At this point it should be noted that the thread grooves of the feed screw 18 act in effect as a single lead screw common to both scanning heads since the half nuts of the heads successively travel through the thread of one hand for one direction of movement and are returned by the thread of the other hand. In order to prevent any physical relative displacement between the scanning heads 38 and 39 this single lead screw is cut fractionally to eliminate such physical displacement. In other words this thread is cut to the nearest half turn instead of a full turn in order to prevent a physical relative displacement of 180 degrees at the time of reversal of movements.

Mounted on the base plate 1 at one end is an insulating terminal plug 48 to which the various leads of the device may be brought. Included in these leads are the wires 49 and 50 which are connected to the guide rods 36 and 37 respectively. These guide rods are mounted in the plates 2 and 3 by means of insulating bushings so as not to form electrical contact therewith. The scanning heads 38 and 39 although slidably mounted on the rods 36 and 37 are insulated therefrom so that one circuit wire for the electrical operating element of each is connected thereto. The other lead for the operating element is grounded on the machine in any suitable manner, the base 1 and side plates 2 and 3 in the particular embodiment herein illustrated of course being conductive. For example, the grounded contact can be through the cam follower extensions 38′ and 39′ and the cooperating cam rods 27 and 28 as an illustrative example, although in the actual machine other methods of grounding the other terminal of the operating element of the scanners can be used.

Figure 1:
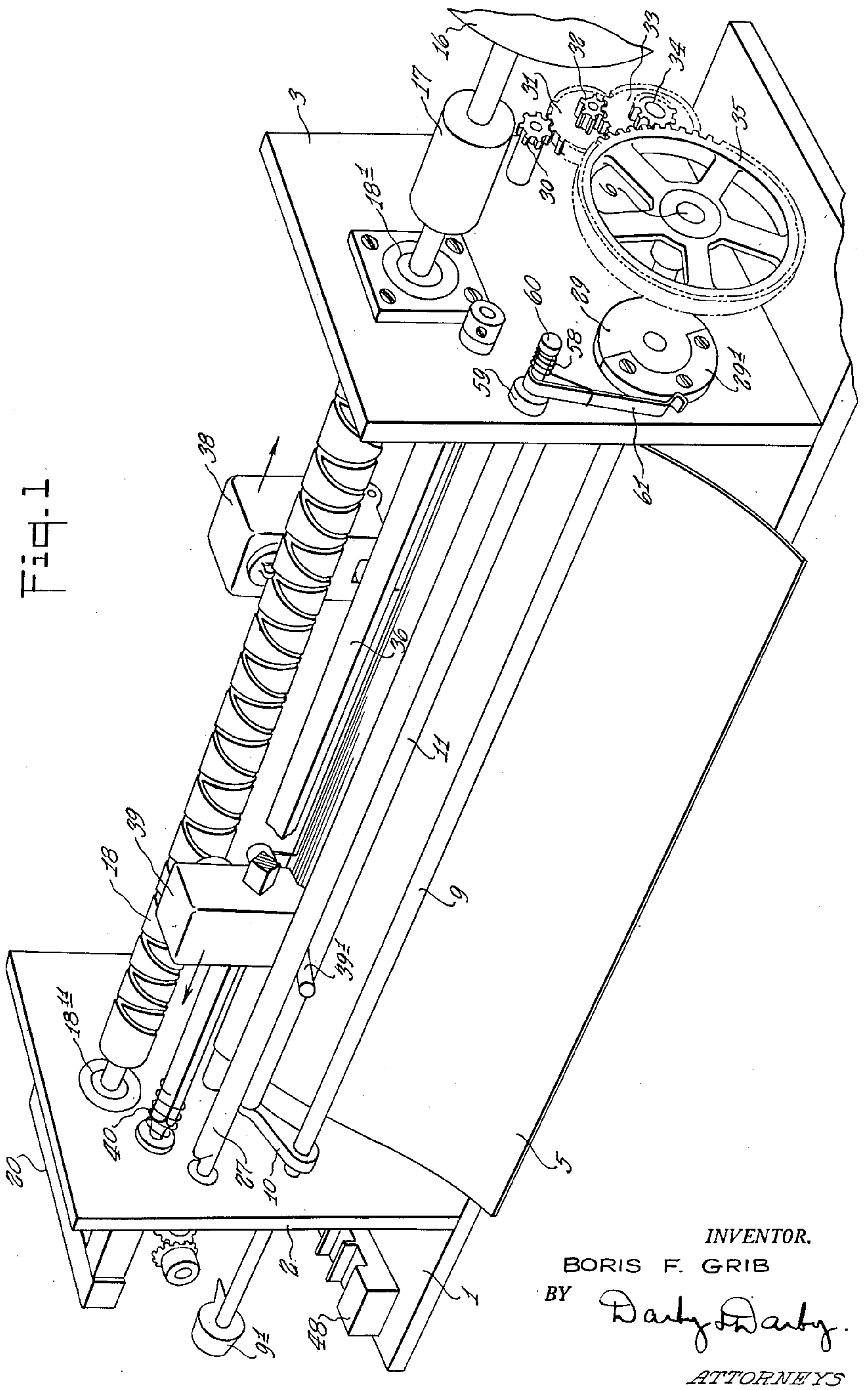
Figure 1 is a perspective view of a physical embodiment of the subject matter of this invention with some parts broken away.

As shown in Figure 1, a metal stud 60 is mounted upon the plate 3 and insulated therefrom by means of an insulating bushing 59 and has rotatably mounted thereon a contact finger biased by spring 58 in engagement with the commutator 29 as shown.

Figures 10, 11:
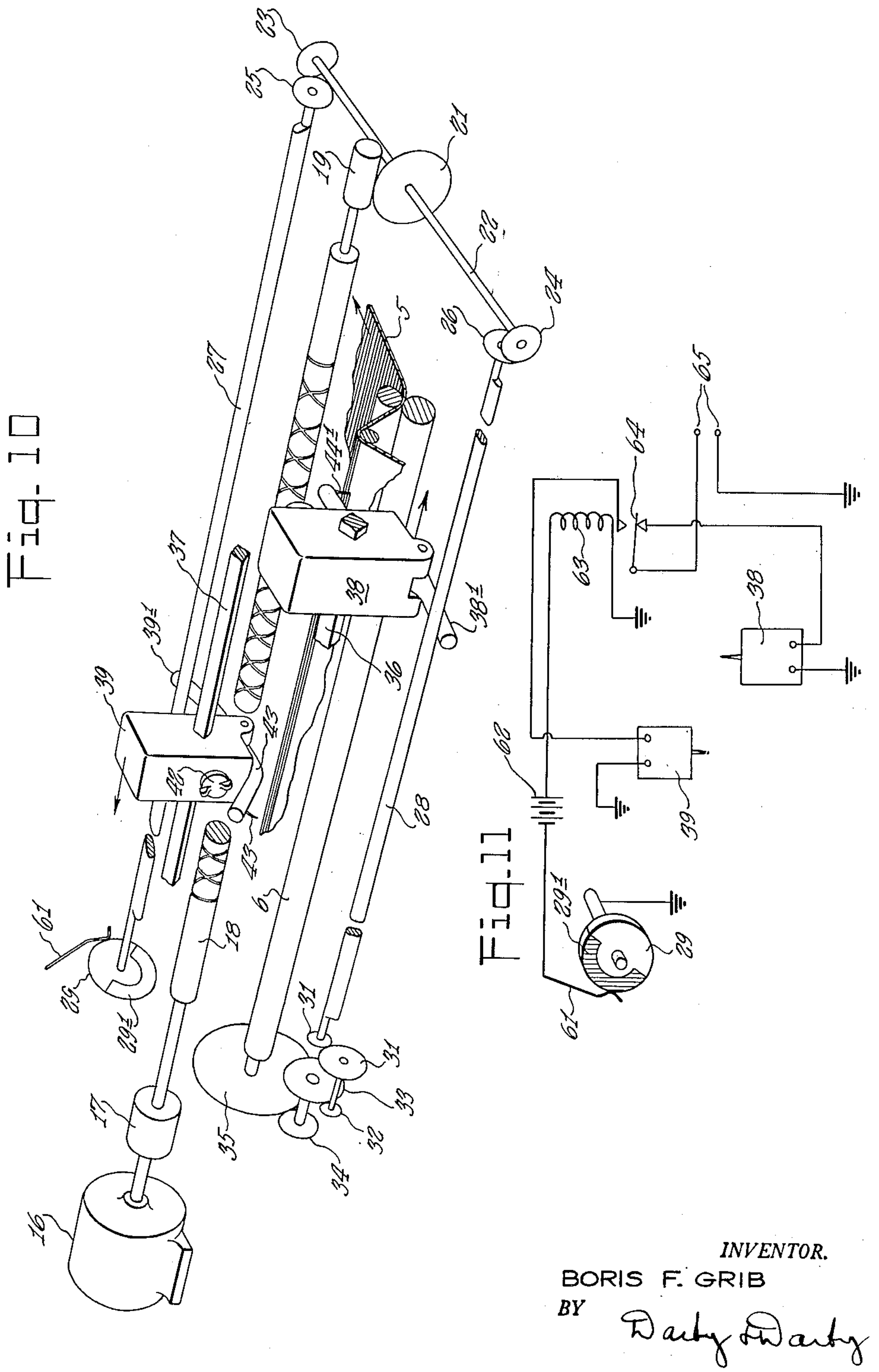
Figure 10 is a somewhat diagrammatic view in perspective of the main operating valves of the mechanism.
Figure 11 is a circuit diagram for the device.

The circuit for this apparatus is diagrammatically illustrated in Figure 11. The commutator is grounded on the frame of the machine as shown and the insulated contact finger 61 is connected to one terminal of a suitable current source such as the battery 62. The other terminal of this battery is connected to a grounded winding 63 of a relay having the two-position movable contact 64. One of the fixed contacts of the relay is connected to ground through the scanning head 38 and the other contact is connected to ground through the scanning head 39. The wires 49 and 50 will be part of the leads from the fixed contacts to the scanning heads 38 and 39, as will be obvious. The movable contact of the relay and a ground lead are connected to a pair of terminals 65 through which the signal representative of the material being scanned in the case of transmission is connected to a transmission circuit which may include a wire line, a radio transmitter, or various well known combinations thereof.

The operation of the device has been indicated at least in part from the above description but will be reviewed here in detail. Assuming that the structure herein disclosed is used at the transmitter, or what has sometimes been hereinbefore termed the reproducer, the strip of paper 5 will bear on its face the material to be transmitted which may be drawings, maps, writing, or any other form of pictorial illustration. The paper, of course, is fed under the idler roller 14 over the anvil bar 8 and between the feed roller 6 and spring biased idler roller 11. The transmission circuit will be connected to the terminals 65 (Fig. 11). Assuming that the stylus unit 38 is the transmitting scanner and is traveling from left to right (Fig. 1), the insulator strip 29′ of the commutator will be under the contact 61 as shown in Figure 11, so that the relay winding 63 is de-energized. Assuming further that the transmitting scanner 38 is at the lefthand edge of the sheet 5 (Fig. 2) the operation will proceed as follows. With motor 16 operating it will be understood that the feed screw 18 is revolving and the half nut 41 is engaged with the thread of the feed shaft 18. Also assuming that the threads have been cut so that for the direction of rotation of the feed shaft 18 with the parts in this position the transmitting scanner 38 will move to the right sliding along the rod 36, as the contact finger 61 is on the insulating strip 29′ of the commutator the circuit to the winding 63 will be broken and hence the transmitting scanner 38 will be connected to the terminal 65. Thus the transmitting scanner 38 will progress from left to right until it arrives at the righthand edge of the strip 5. During this period its stylus will be converting the pictorial material on the strip 5 into an electric signal current representative thereof. It will be understood, of course, that the strip 5 must be suitable for this type of operation, that is, suitable for electrically converting the pictorial matter into such a signal. The stylus 44′ will contact the sheet throughout its scanning trip from left to right, and while the transmitting scanning head 38 is making this trip the other transmitting scanning head 39 (which is out of circuit) will be returning from right to left.

The rotation of the feed shaft 18 will cause cam bars 27 and 28 to rotate as worm 19 will drive wormwheel 21 which in turn will cause shaft 22 to revolve and with it the bevel gears 23 and 24. These bevel gears will drive the mating bevel gears 25 and 26 causing the cam shafts 27 and 28 respectively to rotate in proper timed relation. Cam bar 28 will also cause the feed roller 6 to rotate through the gear train 30 to 35 inclusive. However the feed roller 6 will be rotating by reason of the gear ratio of this train at a very slow rate so that the scanning line will be slightly inclined to the longitudinal axis of the strip 5. The camming surface of cam 28 is relatively positioned during the scanning trip of the head 38 so that the cam follower tail piece 38′ of this head will not be engaged by the cam rod 28, with the result that the stylus 44′ will remain in contact with the strip 5 throughout this trip.

In the meantime, however, the position of the cam rod 27 is such that it will have engaged the cam follower extension 39′ of the other scanning head 39 as it begins its return trip referred to above. As the scanning heads 38 and 39 move towards each other the cam rod 27 will be slowly raising the stylus 43′ (see Fig. 8) so that when the two scanning heads meet at about the center of the device, lever 43 and hence stylus 43′ will have been raised high enough by cam 27 so as to clear the stylus lever 44. After the scanning heads have passed they will move away from each other and the returning scanning head 39 will continue its trip to the lefthand edge of the strip 5 (Fig. 2) and by the time it reaches that edge lever 43 will have dropped back so that as the stylus 44′ reaches the end of its scanning strip at the righthand edge of strip 5, stylus 43′ will engage the strip 5 at its lefthand edge on the next scanning line.

It will now be understood why the lead screw is cut fractionally to insure that as the working stylus reaches the end of its scanning line the other stylus will immediately begin its trip on the next scanning line. Thus no portion of the signal will be lost and no distortion will be introduced into the signal by reason of a physical relative displacement of the two scanning heads. Now it will also be understood why the half nuts 41 and 42 are pivotally mounted on the scanning heads. At the moment of reversal of the direction of movement of the scanning heads, which is at the time the thread changes from one hand to the other, these half nuts may rotate so as to easily follow the thread without binding.

The insulating strip 29′ of the commutator 29 is arranged in proportion with respect to the contact finger 61 so that as the scanning head 38 reaches the end of its scanning line, contact 61 will engage the conductive portion of the commutator 29 causing the relay winding 63 to be energized, with the result that movable contact 64 shifts over to cut the scanning head 38 out of circuit and place the scanning head 39 in circuit (see Fig. 11). Scanning head 39 is now operating and converting the elemental areas of the next scanning line into an appropriate signal and that signal is being applied to the terminals 65.

Those skilled in the art will readily understand that the subject matter of this invention can also be used at the receiving station in which case the recording medium will comprise the strip 5 of a material adapted to electrical recording of which there are a number of well known types. As the receiving apparatus is operated in synchronism with the transmitter it will be seen that the scanning receiving heads will be operating in synchronism with the scanning transmitting heads. It will also be understood, as previously mentioned that mechanical, electrical or optical scanning heads can be used in this device. For example, if optical scanning heads are used at the transmitter and receiver the pictorial matter to be transmitted will be scanned by a spot of light and at the receiver the strip 5 will consist of a light sensitive material the elemental areas of which are successively exposed to a spot of light traveling along the scanning line and varying in intensity in accordance with variations in the strength of the signal current being generated at the transmitter and applied to the receiving scanning head.

From the above description it will be apparent to those skilled in the art that the apparatus herein disclosed is capable of continuous transmission and reception within the practical limits of the length of strip that can be formed into the roll 5 at the transmitter and at the receiver.

It will also be understood that the details of construction herein illustrated by way of example are capable of considerable variation. I do not, therefore, desire to be strictly limited to the illustrative embodiment selected for use herein in disclosing the subject matter of this invention. For example it will be appreciated that the scanning heads 38 and 39 have only been diagrammatically illustrated in view of the fact that the details thereof will vary with the type of scanning head used and the refinements which may be used in connection therewith are well known. In view of all the foregoing, I prefer to be limited by the claims rather than by the disclosure. Some types of scanning heads, for example the optical type, may be so constructed as not to cause mechanical interference between the two heads as they pass, in which event the camming rods 27 and 28 and cooperating mechanism may not be required.

In the claims the phrase "scanning head" will be used with the intent of including all types of scanning heads, and whether they be transmitting or receiving scanning heads. Also in the claims the phrase "scanning trip" will be used in the sense of the operative trip of the scanning head as distinguished from its return trip during which it is inoperative.

What is claimed is:

1. In a facsimile apparatus a pair of scanning heads, a pair of fixed parallel rods on which said heads may slide, a power driven double threaded screw rotatably mounted in parallel relation to said rods, said threads being right and left handed, means for connecting said heads with the threads of said screw to cause said heads to move simultaneously in opposite directions on said rods, a circuit for said heads, and means operating in timed relation to said screw to alternately connect said heads to said circuit, each at the beginning of travel from one end of said screw.

2. In the combination of claim 1, said scanning heads each including a pivotally mounted stylus lever each having a stylus mounted thereon, said styli traversing the same scanning line, and means for moving each of said levers out of the path of the other of said levers as they pass each other.

3. In the combination of claim 1, an anvil bar on which the material to be scanned rests, a pivotally mounted lever forming part of each scanning head, and a stylus mounted on each of said levers so as to engage said strip along a scanning line lying in a vertical plane including the axis of said anvil bar, each stylus being longitudinally curved on the center of pivotal support for its lever.

4. In the combination of claim 1, an anvil rod over which the strip to be scanned passes, each of said scanning heads having a stylus moving along a scanning line lying in the vertical plane including the axis of said anvil bar, and means actuated by the means for moving said scanning heads for raising the stylus of each scanning head on its return trip to avoid interference between said styli as they pass.

5. In a facsimile apparatus a pair of scanning heads supported for movement along a pair of parallel paths, a reversely threaded feed shaft, half nuts attached to said scanning heads and engaging said threaded feed shaft, rotation of said feed shaft causing said heads to move along said paths in opposite directions, a circuit for said heads, and means operated in timed relation with said feed screw for connecting said heads alternately to said circuit at the beginning of each of their scanning trips in one direction.

6. In the combination of claim 5, said scanning heads each including a pivotally mounted lever having a stylus mounted thereon, said styli moving along the same scanning line, and means for raising the stylus lever of the returning scanning head to clear the stylus lever of the advancing scanning head as said heads pass.

BORIS F. GRIB.

REFERENCES CITED

The following references are of record in the file of this patent:

UNITED STATES PATENTS

| Number | Name | Date |
|---|---|---|
| 1,583,536 | Egy et al. | May 4, 1926 |
| 1,918,124 | Nicolson | July 11, 1933 |
| 2,245,286 | Marzocchi | June 10, 1941 |
| 2,278,919 | Erickson et al. | Apr. 7, 1942 |
| 2,296,274 | Finch | Sept. 22, 1942 |
| 2,387,563 | Chapple | Oct. 23, 1945 |
| 2,415,880 | Hassler | Feb. 18, 1947 |